United States Patent Office 3,526,585
Patented Sept. 1, 1970

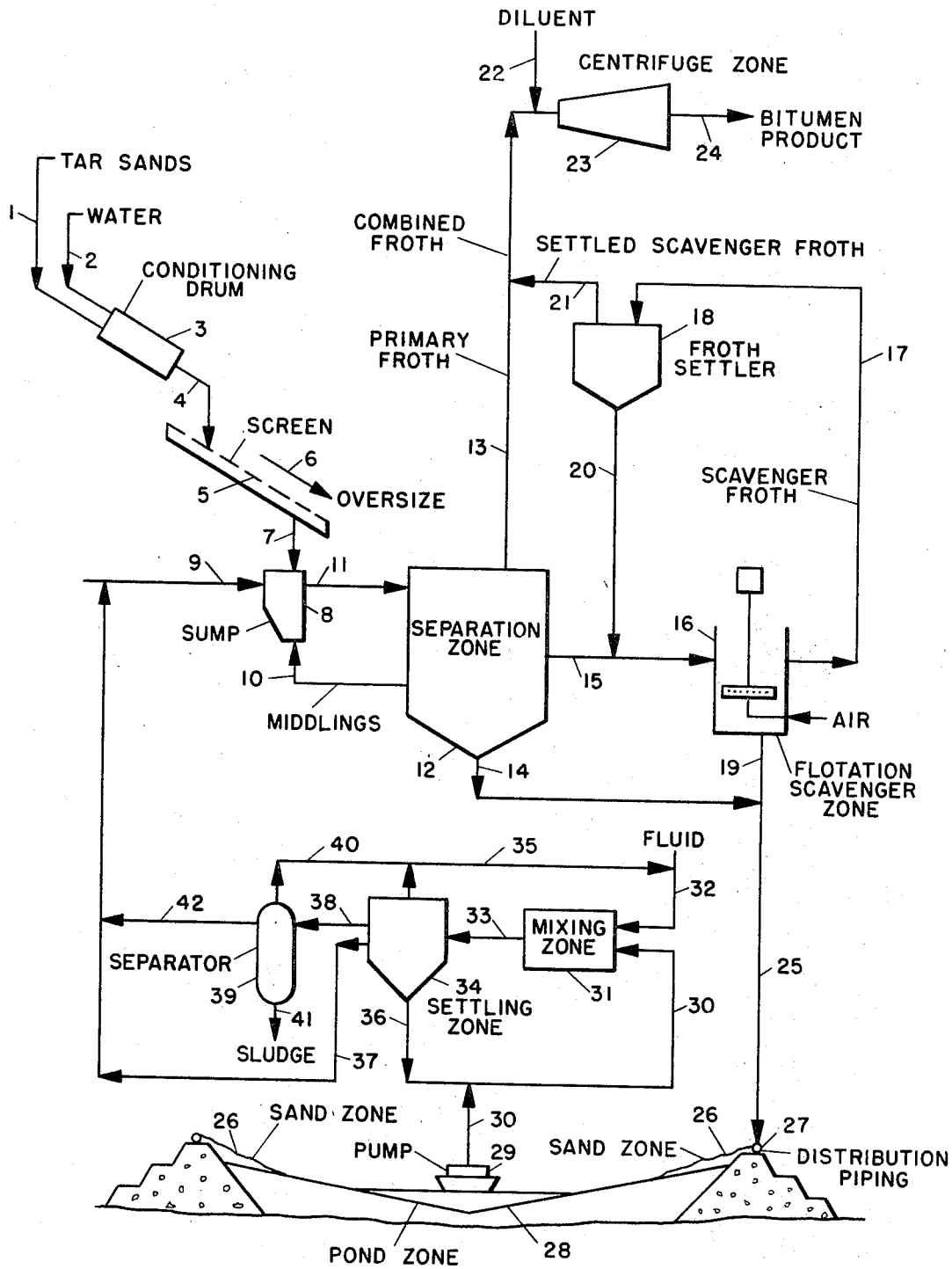

3,526,585
REMOVING SUSPENDED SOLIDS
FROM A LIQUID
Frederick W. Camp, West Chester, Pa., assignor to Great
Canadian Oil Sands Limited, Toronto, Ontario, Canada,
a corporation of Canada
Filed Jan. 22, 1968, Ser. No. 699,435
Int. Cl. B01d 21/01; C10g 1/04
U.S. Cl. 208—11                               11 Claims

ABSTRACT OF THE DISCLOSURE

A process for separating suspended solids from a liquid comprising admixing the liquid with a fluid immiscible with the solids-containing liquid, settling the resulting mixture to form an interfacial zone in which the solids have concentrated, separately removing interfacial zone material from the settler, and treating the material by a coventional process to separate the solids from the liquid. The invention is particularly applicable to the clarification of water discharged from a hot water process for the separation of bitumen from tar sands.

---

The present invention relates to a process for removing suspended solids from a liquid. In its preferred embodiment, the present invention relates to a process for removing clay and fine material from the water portion of an effluent discharge from a hot water process for treating bituminous tar sands.

Removal or separation of suspended solids from a liquid stream is a problem common in the petroleum, chemical process, water treatment, sewage treatment and other industries. Typical solutions to this problem are settling, filtration, evaporation and distillation. In some cases, because of the finely divided or gelatinous nature of the solids the only recourse is to distillation or evaporation. While in general any volatile liquid may be distilled or evaporated away from less volatiles and non-volatile solids, in practical terms the cost for heat in this process may be commercially prohibitive.

The principle of the present invention is to add to a liquid phase which contains suspended solids a second phase immiscible with the first phase. At the interfacial zone which forms between the phases, solids accumulate because of their natural surface activity. In the interface zone, the ratio of solids to original liquid is much higher than in the liquid phase feed. This enriched zone is removed and treated according to conventional separation methods.

The process can be described as a method for separating suspended solids from a volatile liquid which comprises admixing a volatile liquid containing suspended solids with a volatile fluid immiscible with the solids-containing liquid. The added fluid should not be a solvent for the solids. The mixture of liquid and fluid is then settled to form an interface zone. The suspended solids collect at and near the interface zone because of natural surface activity. A surfactant can be added at this point to facilitate the surface activity of the solids. The concentration ratio of solids to liquid at portions of the liquid which are at or near the interface zone or substantially adjacent the zone is greater than the concentration ratio of solids to liquid in portions not substantially adjacent the zone. The portion of liquid in the zone or substantially adjacent the interface zone is then removed and subjected to a conventional solids from liquid separating process.

The process of the present invention is applicable to the separation of any solid from a volatile liquid in which the solid is suspended. Also, any volatile fluid can be added in the process of the present invention to form the interface zone so long as the volatile added fluid is immiscible with the solids-containing liquid and so long as the added fluid is not a solvent for the solids contained in the liquid. The following table illustrates particular systems of the present invention. Column A of the table enumerates several solids which can be suspended in the volatile liquids of Column B. Column C enumerates various volatile fluids which can be added to the particular liquid of Column B to form the two-phase interface:

TABLE I

| A | B | C |
|---|---|---|
| Solids | Liquid | Added fluid |
| Clay | Water | Hexane. |
| Sewage sludge | do | Mineral spirits. |
| Clay-viscous oil mixtures | do | Do. |
| Iron rust | Gasoline | Water. |
| Carbon black | Lubricating oil | Do. |
| Tank bottom sludge | Gasoline | |
| | Jet fuel | Do˙ |
| | Home heating oil | |

It should be noted from the table that the process of the present invention is applicable to systems wherein two or more solids are suspended in the volatile liquid.

A chemical treatment step can be added to the process of the present invention to render the solids more surface active and consequently more attracted to the interface zone between the two phases. The chemical treatment step can comprise treatment with a flocculant type or surfactant type of reagent or with both a flocculant and a surfactant type. If a flocculant type, the particular reagent used, of course, depends on the particular system. Flocculation appears to cause the suspended solids to form a gel-like mass which is more readily trapped in the interface zone.

If a surfactant type of reagent is used, the surfactant should carry on one of its portions (the hydrophilic portion in the case of a system with a water phase), a charge opposite to the surface charge on the suspended solids. For example, if the treated system is a clay in water system, the hydrophilic portion of the surfactant should have a positive charge—a cationic surfactant. The other portion of the surfactant is of a molecular structure and size for easy solubility in the added immiscible fluid. In the case of a clay-water-benzene system the hydrophobic portion of the surfactant is of a molecular structure and size for easy solubility in the benzene. A good surfactant for this system is $RNH_2Cl$ where R is an aliphatic $C_{18}$ carbon chain.

The following Table II gives examples of some suitable reagents for particular solids-containing liquid systems. The table is not intended to be exhaustive of all the possible combinations of systems and reagents but is merely intended to show some typical examples:

TABLE II

| System | Class of reagent | Type |
|---|---|---|
| Clay/water | Flocculant | Mineral acids, $CO_2$, Proprietary organic flocculants such as high molecular weight polyacrylamides, miscible organics such as methanol or acetone. |
| Do | Cationic surfactant. | Fatty amines such as $R_1NH_2$-Cl where $R_1$ is an aliphatic carbon chain of $C_8$ to $C_{24}$ preferably $C_{14}$ to $C_{20}$ and quarternary ammonium salts such as $R_1R_2R_3R_4NCl$ where $R_1$ is as above and $R_2$, $R_3$ and $R_4$ are hydrocarbon radicals $C_1$ to $C_{20}$. |
| Iron oxide/water | Anionic surfactant. | $R_1SO_3Na$, $R_1COONa$. |

The chemical reagents are added to the particular systems in low dosage, the optimum amount to be determined for each system by one skilled in the art according to well known teachings of quantities of flocculants or surfactants usable in various suspended solids in liquid systems.

In the preferred embodiment of the present invention the process is applied to the water portion of the effluent discharge or to bitumen-lean middlings from a hot water process for separating bitumen from bituminous tar sands. In this aspect the invention can be described as a process for separating clay and bitumen from at least a portion of the water in the effluent discharge from a hot water process for separating bitumen from the sands. This process comprises admixing a volatile fluid which is immiscible with the water. The water portion and volatile fluid mixture are then settled so that the mixture forms a two-phase interface at which the suspended clay, fine mineral and bitumen collect in greater concentrations than elsewhere in the water because of the natural surface activity of such suspended solids. The water portion adjacent the interface is then removed and subjected to a conventional separation.

A chemical reagent can be added to this system to facilitate the attraction of clay to the interface. Any of the reagents specified for clay/water systems in Table II are usable in treating pondwater. The amount of reagent used can, of course, be determined for each particular reagent added. For example, where $H_2SO_4$ is added to the system to promote flocculation, enough $H_2SO_4$ should be added to give about 600 p.p.m. in the water portion. Typically, a few p.p.m.—about 10 p.p.m.—to about one percent are added. If an acid is used as a flocculant in this system, regardless of the particular acid used, sufficient amount is added to adjust the pH of the water layer to 5.0 or less, preferably pH 3 to pH 5.

In some instances in the practice of the present invention it has been found that increased concentration of solids at the interface zone can be achieved by raising the temperature of the system. For example, in treating some clay-water suspensions it has been found that increased concentration of solids at the interface is brought about by raising the temperature of the suspension above about 100° F. This improvement brought about by temperature increase has been particularly observed in the treatment of hot water process pondwater.

The particular evaporation or distillation apparatus and procedure used in the present invention will vary according to the particular nature of the suspended solid-containing liquid treated. Generally any known process can be used for effecting the separation. For example, a forced circulation evaporator, which is suitable for a wide variety of applications, can be used. This evaporator usually consists of a circulating pump, a heat exchanger, and a flash chmber or vapor head. Volumes of liquid far larger than the volume of feed are pumped from the flash chamber, through the heater, back to the flash chamber. The heater can be of a shell-and-tube construction and may be arranged vertically or horizontally. Tube dimensions are chosen to give fluid velocities as low as 4 or 5 feet/second for thick abrasive slurries.

The agitated-film evaporator can also be classed as a forced-circulation machine inasmuch as it uses mechanical energy to improve heat transfer. The heating surface consists of a single large-diameter, cylindrical or tapered tube in which is rotated a series of wipers, either maintaining a fixed close clearance from the wall or riding on a film of liquid on the wall.

The centrifugal still is another form of evaporator using mechanical energy, in this case centrifugal force, to carry liquid as a thin film across a heating surface. It is used for very high boiling, heat-sensitive materials and usually operates at absolute pressures of the order of $10\mu$ of mercury (molecular distillation). The molecular centrifugal still usually takes the form of a rapidly rotating disc or cone, heated on one side and fed at the axis on the other side. The condenser is placed close to the rotor so that the distance for vapor travel is less than the mean free path of an evaporating molecule so that the molecule has little chance to suffer collisions that might return it to the film on the rotor.

The short-tube vertical or calandria evaporator consists of short tubes of large diameter fitted by expansion at tube sheets that extend the full diameter of the body. Circulation is by natural convection induced by the vapor generated in the tubes. Only a small fraction of the liquid is evaporated in each pass through the tubes. The unevaporated portion is returned to the zone below the bottom of the tubes.

Horizontal tube evaporators usually comprise a shell which is a horizontal cylinder with a bundle of horizontal tubes generally arranged for easing removal. Steam condenses inside the tubes with liquid boiling outside.

The long-tube vertical evaporator consists simply of a vertical single-pass shell-and-tube heat exchanger surmounted by a vapor-liquid separator with a dished baffle positioned above the tube exits to deflect liquid away from the vapor outlet.

In the multiple-effect evaporators, the vapor given off in one unit of the evaporator is used as the heating medium for another unit boiling at a lower temperature and consequently at lower pressure. The vapor thus formed may then be used to heat yet another unit boiling at still lower temperature. This reuse of vapor continues until the pressure of vapor given off from the last unit is so low that the vapor can barely be condensed by the available cooling medium, which is almost always water from wells, a river, or a cooling tower. Each unit is called an effect and may be of any type of evaporator described previously.

If the process of separation is a distillation rather than an evaporation, any conventional distillation column can be utilized including a conventional column, a complex column which has one or more feeds and/or one or more streams withdrawn in addition to the distillate and bottoms, or a system of simple or complex columns.

The preferred embodiment of the present invention can be best described with reference to the drawing which shows a process for separating suspended solids from the water portion of an effluent discharge from a hot water process for separating bitumen from tar sands.

Deposits of these tar sands exist throughout the world. The most extensive deposits are found in northern Alberta, Canada. The sands are composed of a siliceous material, generally having a size greater than that passing a 325 mesh screen, saturated with a relatively heavy, viscous bitumen in quantities of from 5 to 21 weight percent of the total composition. More typically the bitumen content of the sands is between about 8 to 15 percent. This bitumen is quite viscous and contains typically 4.5 percent sulfur and 38 percent aromatics. Its specific gravity at 60° F. ranges typically from about 1.00 to 1.06. The tar sands also contain clay and silt. Silt is defined at material which will pass a 325 mesh screen but which is larger than 2 microns. Clay is material smaller than 2 microns including some siliceous material of that size. There are several well-known processes for effecting separation of bitumen from the tar sands.

In the hot water method, the bituminous sands are jetted with steam and mulled with a minor amount of hot water at temperatures in the range of 140° to 210° F. The resulting pulp is conducted to a sump where it is diluted with additional hot water and carried to a separation cell maintained at a temperature of about 150° to 200° F. In the separation cell, sand settles to the bottom as tailings and bitumen rises to the top in the form of an oil froth. An aqueous middlings layer containing some mineral and bitumen is formed between these layers. A scavenger step may be conducted on the middlings layer from the primary separation step to recover additional amounts of bitumen therefrom. This step usually comprises aerating the middlings as taught by K. A. Clark, "The Hot Water Washing Method," Canadian Oil and Gas Industries 3, 46 (1950). These froths can be combined, diluted with naphtha and centrifuged to remove more water and residual mineral. The naphtha is then distilled off and the bitumen is coked to a high quality crude suitable for further processing.

In the figure, bituminous tar sands are fed into the system through line 1 where they first pass to a conditioning drum or muller 3. Water and steam are introduced from 2 and mixed with the sands. The total water so introduced is a minor amount based on the weight of the tar sands processed and generally is in the range of 10 to 45 percent by weight of the total mixture. Enough steam is introduced to raise the temperature in the conditioning drum to within the range of 130° to 210° F. and preferably to above 170° F. Monovalent alkaline reagent can also be added to the conditioning drum usually in amount of from 0.1 to 3.0 lbs. per ton of tar sand. The amount of such alkaline reagent preferably is regulated to maintain the pH of the middlings layer in separator zone 12 within the range of 7.5 to 9.0. Best results seem to be obtained at a pH value of 8.0 to 8.5. The amount of the alkaline reagent that needs to be added to maintain a pH value in the range of 7.5 to 9.0 may vary from time to time as the composition of the tar sands as obtained from the mine site varies. The best alkaline reagents to use for this purpose are caustic soda, sodium carbonate or sodium silicate, although any of the other monovalent alkaline reagents can be used if desired.

Mulling of the tar sands produces a pulp which then passes from the conditioning drum as indicated by line 4 to a screen indicated at 5. The purpose of screen 5 is to remove from the tar sand pulp any debris, rocks or oversized lumps as indicated generally at 6. The pulp then passes from screen 5 as indicated by 7 to a sump 8 where it is diluted with additional water from 9 and a middlings recycle stream 10. In the event the clay content of the tar sands is high, a relatively high rate of fresh feed water introduction through 9 can be employed to compensate for the high clay introduction while a correspondingly high rate of transfer of middlings layer through line 15 as hereinafter described can be maintained. Under these circumstances recycling of the other stream of middlings through line 10 to the sump is not required.

Modifications that may be made in the process as above described include sending a minor portion of the middlings recycle stream from line 10 through a suitable line (not shown) to the conditioning drum 3 to supply all or a part of the water needed therein other than that supplied through condensation of the steam which is consumed. Also, if desired, a stream of the middlings recycle can be introduced onto the screen 5 to flush the pulp therethrough and into the sump. As a general rule the total amount of water added to the natural bituminous sands as liquid water and as steam prior to the separation step should be in the range of 0.2 to 3.0 tons per ton of the bituminous sands. The amount of water needed within this range increases as the silt and clay content of the bituminous sand increases. For example, when 15 percent by weight of the mineral matter of the tar sands has a particle size below 44 microns, the fresh water added generally can about 0.3 to 0.5 ton per ton of tar sands. On the other hand, when 30 percent of the mineral matter is below 44 microns diameter, generally 0.7 to 1.0 ton of water should be used per ton of tar sands. Correspondingly the amount of oil-rich middlings removed through line 11 will vary depending upon the rate of fresh water addition. As a general rule the rate of withdrawal of oil-rich middlings to scavenger zone 16 will be 10 to 75 gallons per ton of tar sands processed when 15 percent by weight of the mineral matter is below 44 microns and 150 to 250 gallons per ton when from 25 to 30 percent of the mineral is of this fine particle size.

Further following the process, the pulped and diluted tar sands are pumped from the sump through line 11 into the separation zone 12. This zone comprises a cell which contains a relatively quiescent body of hot water. In the cell, the diluted pulp forms into a bitumen froth layer which rises to the cell top and is withdrawn via line 13, and a sand tailings layer which settles to the bottom to be withdrawn through line 14. An aqueous middlings layer between the froth and tailings layer contains silt and clay and some bitumen which failed to form froth. In order to prevent the buildup of clay in the system it is necessary to continually remove some of the middlings layer and supply enough water in the conditioning operations to compensate for that so removed. The rate at which the middlings need to be removed from the system depends upon the content of clay and silt present in the tar sands feed and this will vary from time to time as the content of these fines varies. If the clay and silt content is allowed to build up in the system, both the density and the viscosity of the middlings layer will increase. Concurrently with such increase, an increase in the proportions of both the bitumen and the sand retained by the middlings will occur. If the clay and silt content is allowed to build up too high in the system, effective separation no longer will occur and the process will become inoperative. This may be avoided by regulating the recycling and withdrawal of middlings and input of fresh water per the invention disclosed and claimed in the Floyd et al. U.S. Ser. No. 509,589, filed Nov. 24, 1965 and now U.S. Pat. No. 3,401,110 issued Sept. 10, 1968. However, even when the separation step is operating properly the middlings layer withdrawn through line 15 will contain a substantial amount of bitumen which did not separate. Hence the middlings layer withdrawn through line 15 is, for purpose of description, herein referred to as "oil-rich" middlings or "bitumen-rich" middlings.

The bitumen middlings stream withdrawn from separator 12 through line 15 is sent to a scavenger zone 16 wherein an air flotation operation is conducted to cause tthe formation of additional bitumen froth. The processing conducted in the scavenger zone 16 involves air flotation by any of the air flotation procedures conventionally utilized in processing of ores. This involves providing a controlled zone of aeration in the fltaotion cell at a locus where agitation of the middlings is being effected so that air becomes dispersed in the middlings in the form of small bubbles. The drawing illustrates a flotation cell of the subaeration type wherein a motorized rotary agitator is provided and air is fed thereto in controlled amount. Alternatively the air can be fed in through the shaft of the rotor. The rotor effects entraining of the air in the middlings. This air causes the formation of additional bitumen froth which passes from the scavenger zone 16 through line 17 to a froth settler zone 18. A bitumen-lean middlings stream is removed from the bottom of the scavenger zone 16 via line 19.

In the settler zone 18, the scavenger froth forms into a lower layer of settler tailings which is withdrawn and recycled via line 20 to be mixed with bitumen-rich middlings for feed to the scavenger zone 16 via line 15. In the settler zone 18 an upper layer or upgraded bitumen froth forms above the tailings and is withdrawn through line 21 and mixed with primary froth from line 13. The combined froths are at a temperature of about 160°. They are heated with steam and diluted with sufficient naphtha or other diluent from 22 to reduce the viscosity of the bitumen for centrifuging in zone 23 to produce a bitumen product 24 suitable for further processing.

The bitumen-lean middlings in line 19 and the sand tailings from the separation zone 12 are combined to form an effluent discharge which is delivered via line 25 to a sand pile zone 26 via distribution piping 27. The effluent contains between 25 and 60 weight percent sand and silt material which is larger than about two microns. The distribution piping provides for continuous and uniform delivery of the effluent to the sand pile zones where the sand and silt material is deposited. The water in the effluent discharge percolates down through and over the sand pile zone 26 to the pond zone 28 where it collects as pondwater containing up to about 20 weight percent solids, between 80 and 100 percent of which is fine clay of a size smaller than 2 microns. The pondwater also contains between about 0.1 and 1.5 weight percent bitumen. Because of the particular composition of this pondwater, especially because of the presence of the large amounts of finely divided clay material, this material has extremely poor settling characteristics. So long as it remains suspended, however, the water cannot be discarded or to any extent recycled back into the hot water system.

The process of the present invention is uniquely and particularly applicable to treatment of the water portion of the effluent discharge—the pondwaters—or the treatment of at least a portion of the middlings directly. For the purpose of this invention, "pondwater" is effluent discharge from a hot water process which effluent has been settled to give a composition comprising water containing up to about 20 percent solids, between 80 percent and 100 percent of which is fine clay of a size smaller than 2 microns. The effluent discharge from a hot water process comprises middlings material of depleted bitumen content which has undergone final treatment, the sand tailings layer from the process and other discharged water-containing fractions which are not the primary products of the hot water process. The discharge is removed from the process area as a slurry of about 25 to 60, typically 45 percent, solids by weight. The effluent contains virtually all of the clay material which was present in the feed. Typically the amount is 2 to 10 weight percent of the feed. This material is smaller than 2 microns and has extremely poor settling characteristics.

It has surprisingly been found in the application of the present invention to treatment of water portions from the hot water process that the portions can be made amenable to conventional separation processes to prepare the portions for recycle or discard where heretofore such conventional seaparation processes were not so effective. By the process of the present invention, the pondwater is withdrawn from the pond zone 28 by means of pump 29 and is fed via tube 30 into mixing zone 31 where it is intimately contacted with a fluid from line 32 which fluid is immiscible with water. In this particular case, suitable fluids include various light hydrocarbon liquids, any of which may easily be recovered by distillation or by cracking and distillation from bitumen, such as: naphtha, kerosene, mineral spirits. In addition, relatively pure hydrocarbons might be used, e.g., benzene, hexane, toluene, isooctane, etc. The mixture of immiscible fluid and pondwater is removed from mixing zone 31 via 33 to settling zone 34 where the mixture forms an interface between two phases and a sludge layer. Although not shown in the drawing, a chemical treatment can be applied here as described supra to increase the solids concentration at the interface area. If the pondwater is flocculated, this step can be carried out by adding a conventional flocculating reagent to the water with gentle agitation. Among the various reagents useful for fluocculating clay are aluminum sulfate, polyalkylene oxides such as polyethylene oxide, compounds of calcium such as calcium hydroxide, calcium oxide, calcium chloride, calcium nitrate, calcium acid phospate, calcium sulfate, calcium tartrate, calcium citrate, calcium sulfonate, calcium lactate, the calcium salt of ethylene diamine titraacetate and similar organic sequestering agents. Also suitable are guar flour ir a high molecular weight acrylamide polymer such as polyacrylamide or a copolymer of acrylamide and a copolymerizable carboxylic acid such as acrylic acid. Additional flocculants include the polymers of acrylic or methacrylic acid derivatives; for example, acrylic acid, methacrylic acid, the alkali metal and ammonium salts of acrylic acid or methacrylic acid, acrylamide, methacrylamide, the aminoalkyl acrylates, the aminoalkyl acrylamides, the aminoalkyl methacrylamides and the N-alkyl substituted aminoalkyl esters of either acrylic or methacrylic acids. The settled immiscible fluid which is illustrated as the top layer although it could be the bottom layer, is withdrawn and recycled back to the mixing zone via line 35. A sludge layer at the bottom of the settling zone 34 and comprising about the same compositiion as the feed is withdrawn via 36 and recycled back to the mixing zone 31. A clean water zone is withdrawn via line 37 to be charged back to the hot water process. The interface layer is removed via 38 and passed to a conventional separator 39 which in this case is a distillation-evaporation process whereby immiscible fluid is recovered 40 and recycled to the mixing zone 31, a waste sludge is withdrawn via 41 and discarded and a water stream is recovered 42 suitable for recycle back into the hot water process via line 42 to line 9 or otherwise. Another advantage of the present process as applied to pondwater is that the water which is vaporous or at a high temperature near its boiling point as it exits from the distillation zone 39 can be mixed with fresh cold water to obtain a water feed of the desired temperature for charge back into the process.

Although the invention has been described supra with reference to the treatment of pondwater from the hot water process effluent discharge it should be pointed out that the invention can be practiced on any water stream from the separation cell. For example, referring again to the drawing, the bitumen-lean middlings line 19 from the flotation scavenger zone 16 can be directly treated by the invention to separate suspended solids from the water and be recycled back into the process. Also the middlings in line 10 can be treated to separate solids before recycle into the sump 8 for dilution of the tar sands pulp.

The following examples illustrate the preferred embodiments of the present invention:

In each run, the indicated immiscible fluid was added to pondwater from a hot water process for separating bitumen from tar sands and the mixture gently agitated. The pondwater contained about 2 weight percent solids. A surfactant, $RNH_3Cl$, where R was an 18 carbon chain, was added in runs 1, 3 and 4. Sulfuric acid addition was used in runs 1 and 2 to adjust the pH of the pondwater after addition of the immiscible fluid. Runs 1, 2 and 3 were conducted at ambient temperature of about 75° F. while run 4 was conducted at an elevated temperature of 130° F. In each run the sample was settled for about 15 minutes after addition of the immiscible fluid. After settling an interface zone formed between the fluid and the water and was removed and analyzed with the results indicated in Table III. In each run the interface zone contained a mineral to water ratio higher than the mineral to water ratio in the feed.

Runs 3 and 4 show that increased mineral content in the interface zone can be achieved by increasing the temperature of the system.

In all runs because of the higher mineral content of the interface fraction, this fraction is amenable to an economic and efficient application of a conventional separator.

TABLE III

| | Run number | | | |
|---|---|---|---|---|
| | 1 | 2 | 3 | 4 |
| Fluid/pondwater ratio volume/volume | 2/3 | 1/4 | 2/3 | 2/3 |
| pH | 6 | 4 | 7.6 | 7.6 |
| Immiscible fluid | Benzene | (¹) | Benzene | Benzene |
| 5% $RNH_3Cl$ solution, weight percent | 0.1 | 0 | 0.1 | 0.1 |
| Temperature, °F | 75 | 75 | 75 | 130 |
| Interface zone: | | | | |
| Total weight (grams) | 194 | 26.4 | 33 | 123 |
| Mineral (grams) | 42.7 | 1.35 | 0.8 | 7.8 |
| Fluid and bitumen (grams) | 64.6 | 6.65 | 10.8 | 23.1 |
| Water (grams) | 86.7 | 18.4 | 21.4 | 92.1 |
| Percent mineral | 22 | 5 | 2.3 | 6.3 |
| Percent fluid and bitumen | 33.3 | 24.3 | 32.7 | 18.7 |
| Percent water | 44.7 | 9.7 | 65 | 75 |

¹ Mineral spirits.

What is claimed is:

1. In the hot water process for treating bituminous tar sands which comprises: forming a mixture of bituminous sands and water, passing the mixture to a separation zone to form an upper bitumen froth layer, a middlings layer comprising water, clay and some bitumen, and a sand tailings layer; recovering said froth layer; and passing at least a portion of the middlings layer and tailings layer to a settling pond; the improvement which comprises:

(a) removing at least a portion of the water from said settling pond, said portion comprising water with suspended clay and bitumen;

(b) admixing said portion with a volatile fluid immiscible with water selected from the group consisting of naphtha, gasoline, kerosene and mineral spirits;

(c) settling the resulting mixture in a settling zone to form a fluid layer, a water layer reduced in clay content relative to said portion and an interface layer between said fluid and water layers comprising water, fluid and a higher concentration of clay relative to said portion;

(d) removing at least a portion of said interface layer from the settling zone;

(e) separating said water and fluid from said clay in said interface portion; and recycling the separated fluid to step (b).

2. The process of claim 1 in which step (d) additionally comprises separating said fluid from the water which was separated from the clay in the interface layer.

3. The process of claim 1 in which the mixture of step (a) is chemically treated to promote the concentration of clay in said interface zone.

4. The process of claim 3 in which said chemical treatment comprises adding a flocculating agent to flocculate said clay.

5. The process of claim 3 in which said chemical treatment comprises adjusting the pH of said settled mixture of step (a) to below about 7.5.

6. The process of claim 3 in which said chemical treatment comprises adjusting the pH of said settled mixture of step (a) to above about 9.5.

7. The process of claim 3 in which said chemical treatment comprises adjusting the pH of the water layer to about pH 3 to pH 5 with a mineral acid or gas selected from the group consisting of $H_2SO_4$, HCl and $CO_2$.

8. The process of claim 3 in which said chemical treatment comprises adding a surfactant selected from the group consisting of $R_1NH_3Cl$ and $R_1R_2R_3R_4NCl$ where $R_1$ is an aliphatic carbon chain of $C_8$ to $C_{24}$ and $R_2$, $R_3$ and $R_4$ are $C_1$ to $C_{20}$ hydrocarbon radicals.

9. The process of claim 8 in which said chemical treatment additionally comprises adjusting the pH of the water layer to about pH 3 to pH 5 with a mineral acid or gas selected from the group consisting of $H_2SO_4$, HCl and $CO_2$.

10. The process of claim 1 in which said water layer of step (c) reduced in clay content relative to said portion is recycled back into the hot water process to be added to bituminous tar sands as at least a portion of the water used to form the said mixture of bituminous sands and water.

11. The process of claim 2 which additionally comprises recycling said water separated from said clay in the interface layer from step (d) back into the hot water process to be added to bituminous tar sands as at least a portion of the water used to form the said mixture of bituminous tar sands and water.

References Cited

UNITED STATES PATENTS

| | | | |
|---|---|---|---|
| 2,799,645 | 7/1957 | Musgrove | 210—84 X |
| 2,971,032 | 2/1961 | Bazell | 210—21 X |
| 3,401,110 | 9/1968 | Floyd et al. | 209—166 X |

SAMIH N. ZAHARNA, Primary Examiner

U.S. Cl. X.R.

210—21, 44, 54